MULTIAPERTURED MAGNETIC MEMORY ELEMENT

Filed June 25, 1964

INVENTORS
ALBERT SHERMAN
WILLIAM A. McNAMARA JR.
BY Wade Koontz
ATTORNEY and
Eugene J. Pawlikowski
AGENT United States Patent Office
3,432,824
Patented Mar. 11, 1969

3,432,824
MULTIAPERTURED MAGNETIC MEMORY ELEMENT

Albert Sherman, Cinnaminson, and William A. McNamara, Jr., Moorestown, N.J., assignors to the United States of America as represented by the Secretary of the Air Force Filed June 25, 1964, Ser. No. 378,085
U.S. Cl. 340—174 1 Claim
Int. Cl. G11b *5/00*

ABSTRACT OF THE DISCLOSURE

A magnetic binary storage element comprising a disc of magnetic material having three apertures positioned along a diameter to define four flux legs. A READ pulse conductor passes through the central aperture, a WRITE pulse conductor and an INHIBIT pulse wire pass through one side aperture, and a conductor constituting the element output circuit passes through the central aperture and the other side aperture thereby coupling to the flux leg between these apertures and sensing flux reversals therein. The pulse polarities are such that the magnetomotive force produced by the WRITE pulse is opposite to those produced by the READ and INHIBIT pulses.

This invention relates to magnetic logical or storage elements and, particularly, to a word-oriented storage element capable of operating satisfactorily despite wide variations in temperature.

Much attention has been given heretofore to magnetic storage elements having a substantially rectangular hysteresis loop for their use as binary circuit elements capable of retaining a flux orientation at the "1" or "0" remanent state. Toroidal cores in particular provide a reliable storage function because the remanent flux in the toroid is in one direction or the other, the direction and remanent state being dependent on the direction of the last previously applied MMF. As known in the art, however, where a core is linked by a number of drive windings, the temperature bears importantly on the permissible range of the drive currents. Thus, to switch a given core, more or less drive current might be required depending on the degree of temperature variation.

Accordingly, it is an object of the invention to provide a logical magnetic storage element capable of reliable operation despite extreme excursions in temperature.

Another object of the invention is the provision of a logical magnetic storage element having multiple apertures oriented to induce proper flux distribution for logical switching between remanent states.

A further object of the invention is to provide a logical magnetic storage device which incorporates unidirectional drivers.

Still another object of the invention is the provision of a logical magnetic storage element which mitigates the effects of an imbalance in drive currents.

To accomplish the foregoing objects, a square-loop ferrite core has three apertures placed in a row and symmetrically oriented to define four flux legs of substantially equal width. The center aperture is larger than the adjacent two. Two wires thread the center aperture one of which also threads one of the side apertures. Similarly, the other side aperture is threaded by two wires each adapted to carry opposing currents. The wire through only the center aperture may be designated the main drive lead since, when energized, it clears the core to the "0" state and samples its condition. The two wires threading the one side aperture may be designated the write lead and the inhibit lead, respectively. The single wire which also threads the center aperture and the other side aperture is the sense lead from which an output is gained by the application of a particular current pulse on the main drive lead.

Figure 1:
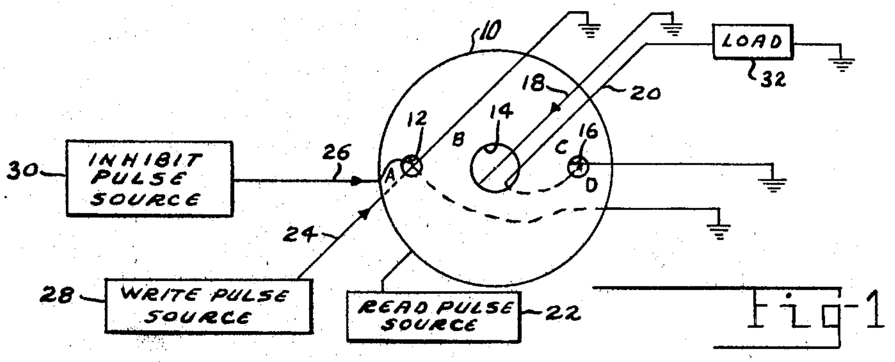

Other objects, features, and advantages of the invention not specifically mentioned will become apparent in the course of the following description of a specific illustrative embodiment thereon when read in conjunction with the appended drawing in which:

FIG. 1 shows a single logical magnetic switching device embodying the invention; and FIGS. 2 through 7 show flux orientations resulting from the application of a specific drive pulse or pulses in the embodiment of FIG. 1.

Referring now to FIG. 1, there is shown a logical magnetic storage core 10 having three apertures 12, 14, 16 the center of which is larger than the adjacent two which are of substantially the same diameter. The multiple apertures define four flux-carrying legs A, B, C and D of substantially equal length. The core 10 is selected of a suitable material which exhibits rectangular hysteresis loop properties whereby an applied magnetic field of one polarity results in a change of flux if the remanent state is of the opposite polarity. A core with a circular periphery is shown as illustrating the invention embodiment. However, other shapes, typical rectangular plates being one example, may be equally suitable.

Core 10 is nearly always saturated in the positive or negative direction, the "1" and "0" states, respectively and does not provide any continuous indication of its state so that particular drive pulses must be used both for switching and for sensing. To this end, through apertures 14 and 16 are threaded leads 18 and 20, the latter bending around by leg C and then threading through aperture 16 to terminate at ground. Lead 18 is the main drive lead and lead 20 is the output or sensor lead. Lead 18 may have applied to it READ pulses from an associated read pulse source 22 to produce a current flowing in the direction indicated by the arrow. Through aperture 12 is threaded leads 24 and 26, lead 24 having write "1" current pulses applied to it from an associated write pulse source 28 to produce a current in the direction indicated by the arrow. Current pulses may be applied to lead 26 by an associated inhibit pulse source 30 and in a direction to oppose the WRITE pulses on lead 24. In a matrix system to which the core 10 and associated leads is particularly applicable, the pulse on lead 26 is generally called the INHIBIT pulse. The READ pulse from a source 22 is applied to sense the remanent condition of core 10. When applied to lead 18, in the absence of all other drive pulses, the READ pulse samples the condition of core 10 and by so doing clears it to the "0" state. As may be seen, READ pulses on lead 18 and WRITE pulses on lead 24 produce opposing magnetomotive forces in core 10. The WRITE pulses from source 28 switch the core to the "1" state. The output lead 20 senses a change in flux in leg C in a particular direction at the time of a READ pulse if core 10 currently is holding a "1." Output signals appear in the load 32 when the flux linking lead 20 is so reversed.

Figure 2:
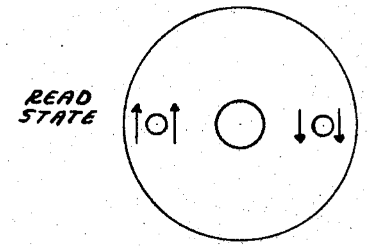
Figure 3:
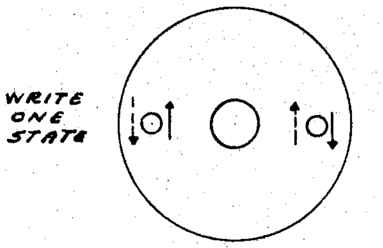

In FIGS. 2 to 7, the same magnetic core 10 is depicted as in FIG. 1, from which a consideration of the various flux states may be given. For simplicity, however, none of the four leads are duplicated in these figures. Also, where the direction of the flux in the legs reverses due to particular applications of the drive pulses, such reversals are represented by dashed lines in the arrows showing the flux directions. FIG. 2 shows the flux plot corresponding to the "0" state immediately after the application of a READ pulse from source 22. This condition may variably be defined as placing the device in the blocked or reset state. In this state, the flux traversing all four legs is switched in a clockwise direction. To write a "1," a WRITE pulse is applied to lead 24 so that, as seen in FIG. 3, the flux directions in legs A and C are reversed. Although the flux reversal in leg C induces a current in output lead 20, the effect of this current is negated by inclusion in the load 32 of a diode (not shown) or other asymmetric conducting element. To read out a "1," a pulse is applied to lead 18 from source 22 which gives the flux plot of FIG. 5. This pulse returns the flux in leg C to the clockwise direction so that an output current in the appropriate direction is generated in lead 20 and passes to load 32. The READ pulse therefore clears the core to "0," the flux plots in FIGS. 2 and 5 being identical.

Figure 5:
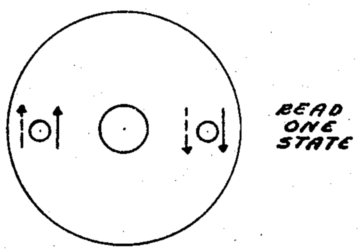

In the sequence in which FIGS. 2, 3 and 5 have been considered, it can be seen that with the core 10 in the READ state of FIG. 2, a WRITE pulse will drive the device to the "1" state described by the flux plot of FIG. 3, and then a READ pulse will return the device to the "0" state simultaneously with reading out the stored "1" on output lead 20.

Considering now the read state of FIG. 2, when a "0" is to be stored, i.e., written, an INHIBIT pulse is applied to lead 26 from source 30 coincidently with the application of a WRITE pulse to lead 24. These pulses, as seen, set up opposing magnetic fields. In actual practice, the INHIBIT pulse will slightly precede the WRITE pulse to ensure no erroneous writing. The coincident INHIBIT and WRITE currents on the flux configuration of FIG. 2 produces the flux directions depicted in FIG. 6. Inasmuch as the WRITE pulse creates a flux in a counterclockwise direction and the flux produced by the INHIBIT pulse is in the opposite direction, the flux cancellation produces no flux reversal in leg C. Thus, when a READ pulse subsequently is applied, there is no flux reversal in leg C and hence no output on lead 20.

A plurality of magnetic storage cores 10 of FIG. 1 may advantageously be arranged in a matrix of the type in which each row of cores stores the bits of a complete binary word. In a word memory of this type a READ wire 18 and a WRITE wire 24 are provided for each row. Wire 18 passes through the central apertures 14 and wire 24 passes through the side apertures 12 of all cores in the row. In addition, an INHIBIT wire 26 and an OUTPUT wire 20 are provided for each column, the INHIBIT wire passing through the side apertures 12 of all cores in the column and the OUTPUT wire 20 passing through the apertures 14 and 16 of all cores in the column. To read out a word stored in any row of the memory, the READ line for that row is pulsed which causes the bits of the word stored in the individual cores of the row to appear simultaneously on the column OUTPUT lines. To write a word in any row of the memory, the WRITE line for that row and the column INHIBIT lines for those cores where "0's" are to be written are simultaneously pulsed. Since each INHIBIT line links cores in all rows, it is apparent that the INHIBIT pulses constitute disturbing influences on the cores in all rows except the one where write-in is taking place.

Figure 6:
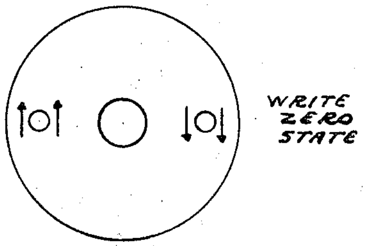
Figure 4:
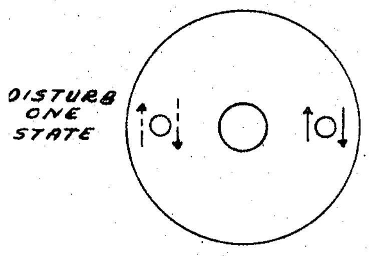
Figure 7:
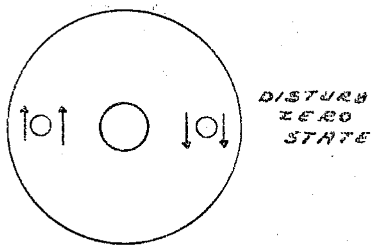

It is essential that this disturbing influence does not destroy the information stored in the core. The effect of an INHIBIT pulse on a core storing a "1" is illustrated in FIG. 4 and the effect on a core storing a "0" is illustrated in FIG. 7. In the core described, whether a "1" or a "0" is stored is determined entirely by the direction of the flux in leg C, the flux direction being upward for a "1" as seen in FIG. 3 and downward for a "0" as seen in FIG. 6. As may be seen by comparing FIG. 4 with FIG. 3, the effect of an INHIBIT pulse on a core storing a "1" is to reverse the flux in legs A and B but not in C and D, which leaves the stored information unchanged. As may be seen by comparing FIG. 7 with FIG. 6, the application of an INHIBIT pulse to a core storing a "0" has no effect on the flux orientation and therefore does not change the stored information.

One desirable feature of the invention embodiment is that when writing in a "0" no flux is switched in any of the four legs, thus leaving the core in the blocked state when a "0" is stored. Another useful feature is the manner of linking leg C with output lead 20. In other systems heretofore known, the output leg is linked with leg D rather than leg C. Thus, if it occurs in such systems that leg A is wider than leg C, some of the flux in leg D will be reversed when the write "0" operation is performed. In such cases, the signal-to-noise output during readout will suffer. Moreover, the greater size of the center aperture 14 with respect to the side apertures requires a severe imbalance in the amplitudes of the INHIBIT and WRITE pulses during the write "0" operation before any possible partial switching in leg C can occur. Furthermore, no amount of disturb signals will cause deterioration of the output to the point where signal discrimination is impossible.

Tables I and II show the output voltages obtained upon application of a READ pulse to the storage element in the cases of two storage elements made from different commercially available three-apertured ferrite cores wired as shown in FIG. 1. Extremely satisfactory operation was obtained over the temperature range of −55° C. to +71° C. Drive currents on all leads were 1.0 amp for the Table I results and 0.5 amp in the case of Table II. For the drive currents of both tests, the pulse width, rise time, and fall time were 2.5 μs., 0.5 μs. and 0.5 μs., respectively.

TABLE I

| Temp. (° C.) | Dist. zero (mv.) | Undist. one (mv.) | Dist. one (mv.) |
|---|---|---|---|
| −55 | 15 | 125 | 150 |
| +25 | 17 | 340 | 360 |
| +71 | 25 | 420 | 410 |

TABLE II

| Temp. (° C.) | Dist. zero (mv.) | Undist. one (mv.) | Dist. one (mv.) |
|---|---|---|---|
| −55 | 3 | 45 | 50 |
| +25 | 3 | 90 | 100 |
| +71 | 5 | 120 | 125 |

Although only a single embodiment of the invention has been illustrated and described, it will be obvious to those skilled in the art that various changes and modifications can be made therein without departing from the spirit of the invention or the scope of the appended claim.

We claim:

1. A binary storage element comprising a core of magnetic material exhibiting a substantially rectangular hysteresis loop, said core having three apertures arranged in a row with the central aperture larger than the two equal outer apertures; a read conductor passing through the central aperture only; a write conductor and an inhibit conductor each passing through the same one of said side apertures only; means for applying a read pulse to the read conductor for establishing a remanent flux pattern in said core representing binary "0"; means for applying a write pulse to the write conductor that passes through said one side aperture in a direction opposite to the direction of said read pulse through the central aperture for establishing a different remanent flux pattern in said core representing binary "1"; means for applying an inhibit pulse to the inhibit conductor that passes through said one side aperture in a direction opposite to that of said write pulse for nullifying the effect of the write pulse on the flux pattern of said core when applied simultaneously with the write pulse; and an output conductor passing through the central aperture and the other of said side apertures only for sensing a reversal of flux direction in that part of the core situated between the two last-named apertures.

References Cited

UNITED STATES PATENTS

| | | | |
|---|---|---|---|
| 3,206,733 | 9/1965 | Briggs | 340—174 |
| 3,209,334 | 9/1965 | Paulsen et al. | 340—174 |
| 3,213,434 | 10/1965 | Russell | 340—174 |
| 3,229,267 | 1/1966 | Engelbart et al. | 340—174 |
| 3,253,268 | 5/1966 | McLane | 340—174 |
| 3,292,163 | 12/1966 | Engelbart | 340—174 |
| 3,298,003 | 1/1967 | Swanson | 340—174 |
| 3,323,113 | 5/1967 | Bennion | 340—174 |

BERNARD KONICK, *Primary Examiner.*

V. P. CANNEY, *Assistant Examiner.*